United States Patent [19]

Childress et al.

[11] 4,352,425

[45] Oct. 5, 1982

[54] BELT CLEANER

[76] Inventors: Ray Childress; Steve Childress, both of P.O. Box 853, Richlands, Va. 24641

[21] Appl. No.: 256,536

[22] Filed: Apr. 22, 1981

[51] Int. Cl.³ .............................................. B65G 45/00
[52] U.S. Cl. ..................................... 198/499; 198/497
[58] Field of Search ................................ 198/499, 497

[56] References Cited

U.S. PATENT DOCUMENTS

| 2,393,724 | 1/1946 | Vickers | 198/499 |
| 3,101,837 | 8/1963 | Martin | 198/499 |
| 3,802,554 | 4/1974 | Paulsen | 198/494 |
| 3,994,384 | 11/1976 | Reiter | 198/497 |
| 4,265,358 | 5/1981 | Ufenhof | 198/499 |
| 4,280,616 | 7/1981 | Wadensten | 198/499 |

FOREIGN PATENT DOCUMENTS 2754263  6/1978  Fed. Rep. of Germany ...... 198/499

*Primary Examiner*—John J. Love
*Assistant Examiner*—Brian Bond
*Attorney, Agent, or Firm*—Littlepage & Webner

[57] ABSTRACT

Reversable scraper blades engaging against one side of a belt run respond through a resilient connection to the movements of a roller engaging against another side of the belt run.

5 Claims, 2 Drawing Figures

BELT CLEANER

FIELD OF INVENTION

Conveyor, power-driven, having cleaning means, with scraper biasing means in class 198 subclass 499.

PRIOR ART

U.S. Pat. Nos. to Martin 3,101,832; Ellington 3,315,794; Matson 3,504,786; Holleman 3,782,534; Oury 3,795,308; Reiter 3,994,384; Reiter 3,994,385; Reiter 3,994,388; Reiter 4,036,354; Stahura 34,098,394.

OBJECTS

Spring-biased blades for scraping material off conveyor belt runs, and which are intended to follow the tautening and sagging movements of the belt caused by load forces thereon have heretofore been devised. However, insofar as is known, none have had the capability of both precisely following the deflective movements of the belt run while maintaining a constant resiliently biased force against the belt surface against which they scrape. The object now is to provide a "boot strap" motion by means of which the deflective movements of the conveyor belt run are sensed by a roller engaging against one side of a belt run and wherein the sensed movements are transmitted through an adjustable spring to scraper blades engaging against another side of the same belt run. By this arrangement it it possible to maintain a constant spring-force of the scaper blades against the belt run surface.

A further object is to provide an assembly of scraper blades which drag slantwise one downstream direction against a belt run surface and which are pivotly mounted so that, when the direction of the belt is reversed, the blades automatically flip over and drag slantwise in the opposite downstream direction.

Figure 1:
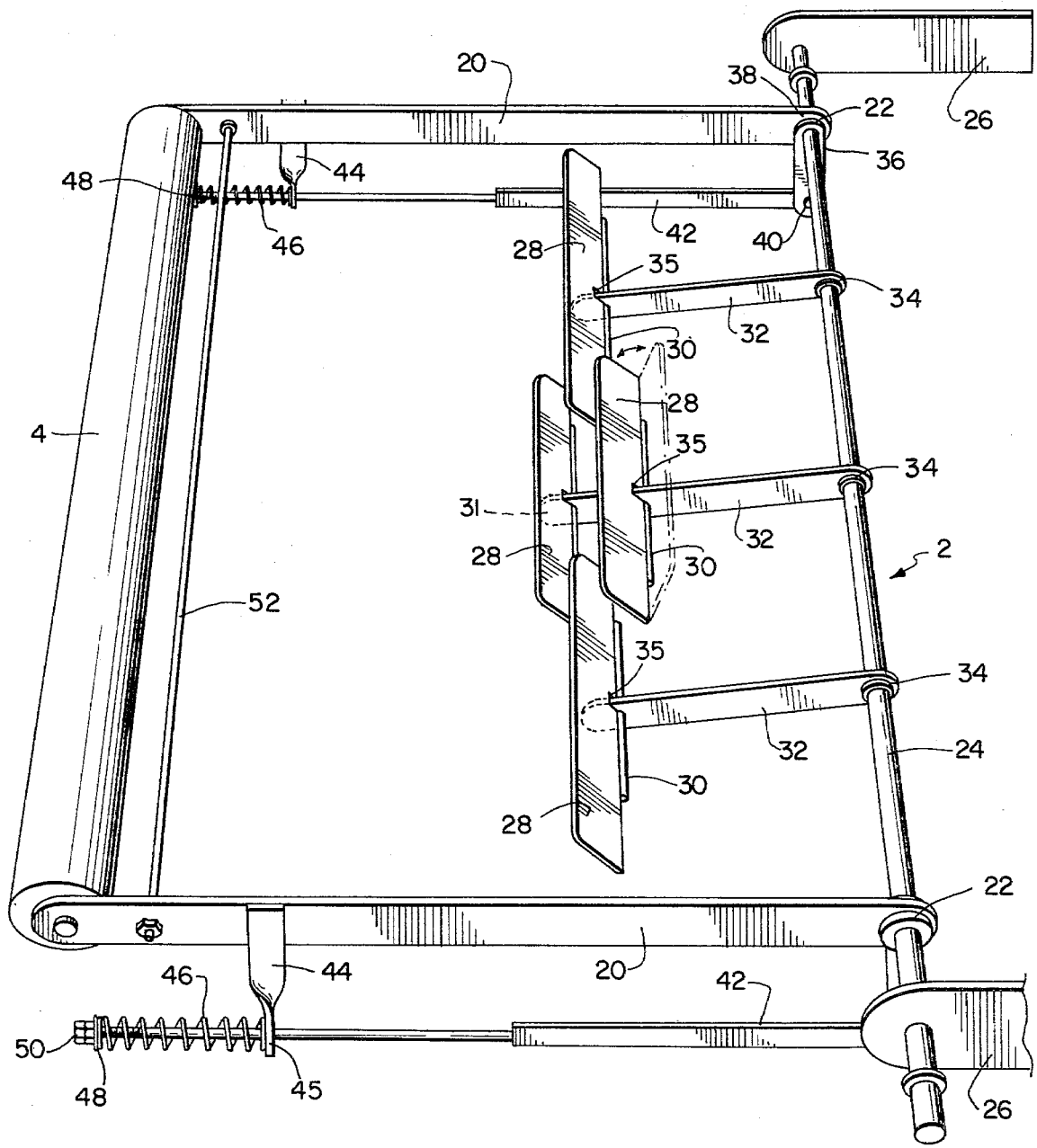
Figure 2:
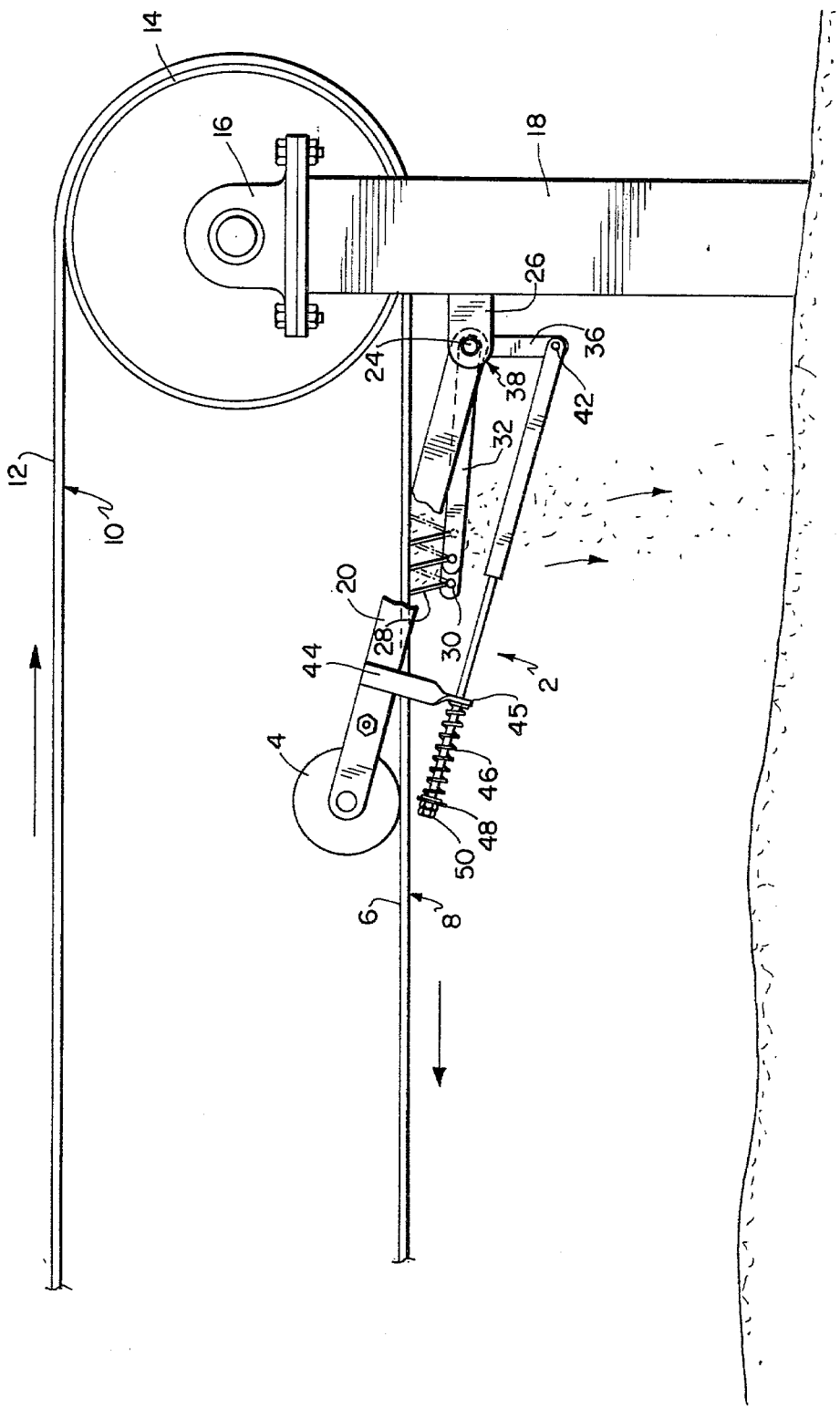

These and other objects will be apparent in the following specifications and drawings, in which FIG. 1 is a perspective view of the scraper blade assembly and, FIG. 2 is a side elevation of the scraper blade assembly as applied to a belt run.

Referring now to the drawings, in which like reference numerals denote similar elements, the belt cleaner 2 is controlled by the roller 4 which rides along the inner surface 6 of the lower run 8 of an endless conveyor belt 10. As will be apparent hereinafter, the scrapers apply against the outer lower surface 12 of the lower belt run. The belt runs around a pulley 14 conventionally supported in bearings 16 on stantions 18 of a fixed support. The belt may ordinarily run in the direction of the arrows but it may be reversed and upon reversal the scraper needs no adjustment, due to the pivoting of the scraper blades described hereinafter.

Roller 4 is rotably supported on outer ends of a pair of arms 20, the inner ends of the arms being rotatably mounted by bearings 22 on a cross-shaft 24 which, in turn, is rotatably mounted on arms 26 extending outwardly from stantions 18. Scraper blades 28 are mounted by pivot 30 on outer end portions of levers 32 whose inner ends are non-rotatably affixed as at 34 on cross-shaft 24. The scraper blades swing between two angular limits each less than 90° to the belt surface. When the belt runs in the direction of the arrows as in FIG. 2, the scraper blades drag in the downstream direction of the belt run and when the belt is reversed, they flip over and drag in the opposite downstream direction. The engagement of the ends of the slots 35 in the scraper blades against the levers 32 limits the swinging movement of the blades.

A pair of crank arms 36 having inner ends non-rotatably affixed as at 38 on cross-shaft 24 have outer ends pivoted as at 40 to inner ends of push-pull rods 42. Near their outer ends the push-pull rods slidably engage through holes in strips 44 affixed on arms 20. The strips 44 are twisted so as to form abutments 45 for ends of compression springs 46 coiled around the push-pull rods. Washers 48 form abutments for the other ends of the compression springs 46 and the compression of the springs can be adjusted by nuts 50 threaded on the outer ends of the push-pull rods. The outer ends portions of arms 20 are connected by a tie rod 52.

In operation, the force stored in compression springs 46 apply against abutment washers 48, thereby tending to pull the push-pull rods 42 to the left, as seen in FIG. 2 and thereby tending to swing crank arms 36 clockwise and thereby rock the cross-shaft 24 clockwise and force scraper blades 28 upwardly against the lower side 12 of the lower belt run 8. When the belt run 8 deflects upwardly, for example, roller 4 rides upwardly, the outer end portions of the push-pull rods are lifted correspondingly upwardly, and the compressive force previously applied the coil springs 46 remains applied against the washer abutments 48 on the push-pull rods, thereby biasing the levers 32 clockwise so that the scraper blades 28 follow the belt run upwardly. When the direction of the belt reverses, the scraper blades 28 flip over so that they assume the then-downstream drag against the lower surface of the belt run.

I claim:

1. A cleaner for an endless belt having upper and lower runs movably mounted on a support, comprising
   a cross shaft,
   means for rotatably mounting the cross shaft on the support for rotation about an axis extending transversely to the lower belt run,
   lever means having an inner end portion affixed on the cross shaft for rotation therewith,
   blade means mounted on an outer end portion of said lever means for scraping against the lower side of the lower belt run,
   roller means for riding along the upper side of said lower belt run,
   elongate arms having inner end portions rotatably mounted on said cross shaft and outer end portions rotatably supporting said roller means whereby the arms are pivoted about said cross shaft by the roller means when the latter follows upward and downward belt deflections,
   crank arm means having inner end portions affixed on the cross shaft for rotation therewith,
   and force-transmitting means engaging between said elongate arms and the crank arm means whereby to rock the cross shaft and thereby move the blade means upwardly and downwardly with said belt run in response to upward and downward deflections of said lower belt run.

2. A cleaner is claimed in claim 1, said force-transmitting means comprising rods, each rod having an inner end portion pivoted to the crank arm means and an outer end portion slidably connected to one of said elongate arms.

3. A cleaner as claimed in claim 2, said force-transmitting means including a compression springs each engaged under compression between an abutment on one of said elongate arms and an abutment on one of said rods.

4. A cleaner as claimed in claim 3, and means for adjusting the compression of said springs.

5. A cleaner as claimed in claim 1, said blade means being pivoted to outer end portions for of said lever means for swinging movement between two angular limits, in one of which limits the blade means are disposed in one downstream direction of the belt run at angles less than 90° to the belt run surface and, in the other of which limits the blade means are disposed in the opposite downstream direction of the belt run at angles less than 90° to the belt run surface.

* * * * *

UNITED STATES PATENT AND TRADEMARK OFFICE
CERTIFICATE OF CORRECTION

PATENT NO. : 4,352,425

DATED : October 5, 1982

INVENTOR(S) : Ray Childress and Steve Childress

It is certified that error appears in the above-identified patent and that said Letters Patent is hereby corrected as shown below:

In column 1, line 12, delete "34,098,394", insert --4,098,394--.

In column 1, line 29, delete "it", second occurrence, insert --is--.

In column 1, line 51, delete "stantions", insert --stanchions--.

In column 1, line 56, delete "rotably", insert --rotatably--.

In column 1, line 60, delete "stantions", insert --stanchions--.

In column 2, line 14, delete "ends", second occurrence insert --end--.

In claim 2, column 2, line 62, delete "is", insert --as--.

In claim 3, column 2, line 68, delete "a".

In claim 5, column 3, line 7, delete "to", insert --on--.

In claim 5, column 3, line 7, delete "for".

Signed and Sealed this

Fifth Day of April 1983

[SEAL]

Attest:

GERALD J. MOSSINGHOFF

Attesting Officer  Commissioner of Patents and Trademarks